(12) United States Patent
Dumas

(10) Patent No.: US 7,910,504 B2
(45) Date of Patent: Mar. 22, 2011

(54) DESERT CAMOUFLAGE

(75) Inventor: Jean Dumas, Quebec (CA)

(73) Assignee: Her Majesty the Queen as represented by the Minister of National Defense of Her Majesty's Canadian Government, Ottawa, Ontario (CA)

( * ) Notice: Subject to any disclaimer, the term of this patent is extended or adjusted under 35 U.S.C. 154(b) by 234 days.

(21) Appl. No.: 11/976,172

(22) Filed: Oct. 22, 2007

(65) Prior Publication Data

US 2009/0104419 A1   Apr. 23, 2009

(51) Int. Cl.
*B32B 5/26* (2006.01)

(52) U.S. Cl. ........ 442/319; 442/131; 442/132; 428/215; 428/221; 428/919

(58) Field of Classification Search .................. 442/131, 442/132, 319; 428/919, 215, 221
See application file for complete search history.

(56) References Cited

U.S. PATENT DOCUMENTS

| | | | | |
|---|---|---|---|---|
| 4,560,595 | A * | 12/1985 | Johansson | 428/17 |
| 2004/0127124 | A1* | 7/2004 | Hexels | 442/131 |
| 2004/0152385 | A1* | 8/2004 | Hellwig et al. | 442/230 |
| 2008/0299854 | A1* | 12/2008 | Hilleary et al. | 442/136 |

* cited by examiner

*Primary Examiner* — Norca L Torres-Velazquez
(74) *Attorney, Agent, or Firm* — George A. Seaby

(57) ABSTRACT

A thermal camouflage material for use on a tank or other military vehicle in a desert environment includes an outer layer of knitted fiberglass alone or with polyester having an outer coating of PVC and carbon black, and an inner film of aluminum; and an inner layer defined by a three-dimensional decoupling fabric between the aluminum film on the outer layer. The decoupling fabric is formed of outer and inner polyester mesh films with polyaramid sandwiched therebetween.

12 Claims, 1 Drawing Sheet

DESERT CAMOUFLAGE

BACKGROUND OF THE INVENTION

1. Field of the Invention

This invention relates to a thermal camouflage material, and in particular to a camouflage material for use on tanks and other vehicles for use in a desert environment.

Solar loading on the air temperature inside of a tank is a serious problem, particularly in desert regions. For example, in Afghanistan, ambient temperatures in excess of 40° C. can cause the temperature inside of a tank to exceed 80° C. Painting the tank beige to match local sand does not significantly reduce the temperature in the crew department.

2. Description of Related Art

Existing materials for reducing solar loading of vehicles consist mainly of thermal insulation, e.g. a layer of polyurethane foam coated with a thermal reflector such as aluminum to reflect the sun's rays. The thermal insulation layer is covered with a camouflage patterned material providing physical protection from the elements. One problem with such a material is that because the insulating layer is in direct contact with the skin of the vehicle it does not allow the escape of heat produced inside the vehicle, and the surface layer does not reduce the vehicle's signature in the thermal band because the layer is optimized to reflect incident solar radiation.

BRIEF SUMMARY OF THE INVENTION

Accordingly, in order to substantially reduce temperature increases inside of a tank or other vehicle, there is a need for materials which will reflect most solar radiation while being thermally insulated from the tank. Moreover, a thermal shield must be visually compatible with the colors of the local environment and, if possible, should have properties which reduce the tank's signature in the thermal and radar bands of the spectrum.

According to one aspect, the invention relates to a thermal camouflage material for use on a vehicle comprising an outer fabric layer; a plastic film coating on an outer surface of said fabric layer; a coating of carbon black on the outer surface of the plastic film; an aluminum coating on an inner surface of said outer fabric layer for preventing inward heat transmission by radiation; and an inner layer including a three-dimensional decoupling fabric for preventing heat transmission from the outer layer to a vehicle.

As used herein, "outer" means a layer or a surface of the material remote from a vehicle, and "inner: means a layer or a surface of the material closest to the vehicle when mounted thereon.

The material of the present invention is designed to reduce the temperature inside of a vehicle by reflecting a large amount of solar radiation, not only in the visible spectrum but also in the near-infrared and thermal bands. Moreover, the material reduces heat conduction and provides an air space between the tank and the outer surface or layer of the material to permit heat generated by the vehicle itself to dissipate by convection.

DETAILED DESCRIPTION OF THE INVENTION

Figure 1:
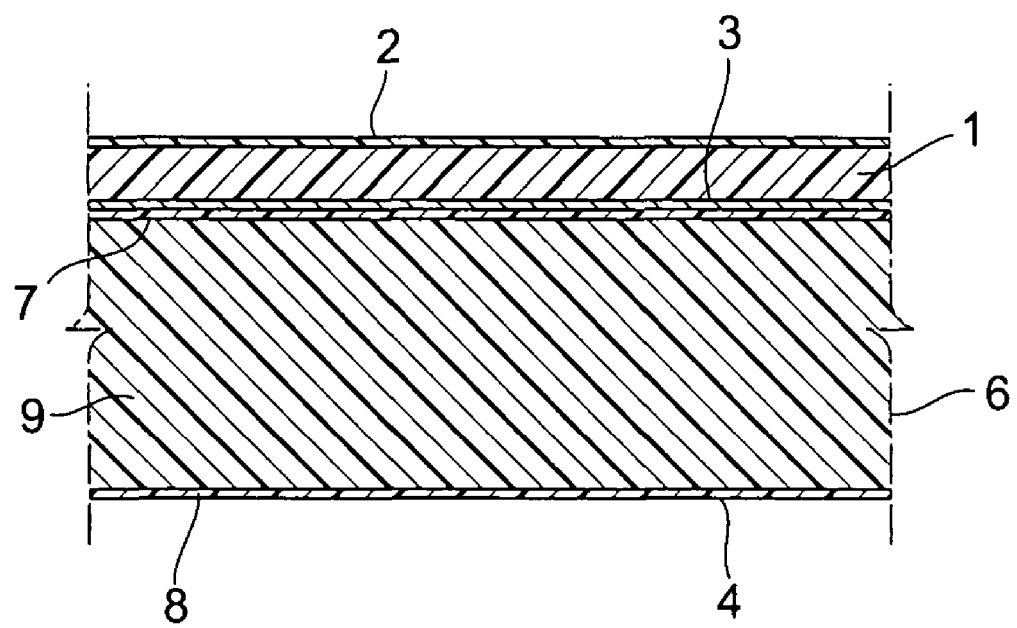
FIG. 1 is a schematic cross-sectional view of a camouflage material in accordance with the invention.

With reference to the single FIGURE in the drawing, the camouflage material of the present invention includes an outer, thermal insulating, fabric layer 1 formed of knitted fiberglass or polyester and fiberglass which are knitted together for high strength. When 100% fiberglass is used, it is preferably G19P33 industrial knitted fiberglass (20×14 pick/sqin) available form Amatex, Norristown, Pa. The outer surface of the layer 1 is coated with a film of polyvinyl chloride (PVC) or polyurethane (PU) film 2 coated with carbon black to increase solar loading on the layer 1. The carbon black applied to the film 2 is the main provider of thermal insulation for the material. When PVC is used, the film is 225 to 275 and preferably 250 microns thick, and the carbon black is 40-60 and preferably 50 microns thick. An aluminum coating 3 is applied to the inner surface of the layer by vapor deposition. The coating 3 is 5-10 microns thick and faces the inner side 4 of the material which is against the heat source (not shown) when mounted thereon. The aluminum coating 3 prevents inward heat transmission by radiation. Moreover, the aluminum increases the effectiveness of the film 2 coated with carbon black, because radiated heat is reflected outwardly or held in the layer 1 more effectively. Most radiated heat is absorbed by the PVC or PU treated with carbon black or reflected by the aluminum coating 3.

In order to reduce heat transmission by direct contact (conduction), an inner layer 6 defined by a 3-dimensional decoupling fabric layer is provided between the Al film on the outer layer 1 and a vehicle skin. Preferably, the decoupling fabric layer 6 is attached to the aluminum side of the layer 1 by stitching (not shown). The layer 6 includes outer and inner polyester mesh films 7 and 8, respectively with polyaramid fibers 9 sandwiched therebetween. An effective thickness of the layer 6 is 5 to 10 mm, and preferably approximately 9.5 mm (⅜ inch). As well as preventing conduction, the layer 6 allows air to circulate between the heat source, e.g. a vehicle skin and the layer 1.

In tests conducted in a climate chamber, the temperature inside of a Leopard tank was reduced by 25° C. using the above described thermal shield. Moreover, the thermal camouflage characteristics of the material reduced the thermal signature of the tank to a level close to that of the background of arid regions.

The invention claimed is:

1. A thermal camouflage material for use on a vehicle comprising an outer fabric layer; a plastic film coating on an outer surface of said fabric layer; a coating of carbon black on the outer surface of the plastic film; an aluminum coating on an inner surface of said outer fabric layer for preventing inward heat transmission by radiation; and an inner layer including a three-dimensional decoupling fabric for preventing heat transmission from the outer layer to a vehicle while allowing air to circulate between the vehicle and the outer fabric layer.

2. The camouflage material of claim 1, wherein said outer fabric layer is formed of knitted fiberglass or polyester and fiberglass.

3. The camouflage material of claim 2, wherein said outer layer is polyester and fiberglass knitted together for strength.

4. The camouflage material of claim 2, wherein said plastic film is formed of polyvinyl chloride or polyurethane.

5. The camouflage material of claim 2, wherein said plastic film is a 225 to 275 micron thick layer of polyvinyl chloride.

6. The camouflage material of claims 5, wherein said layer of polyvinyl chloride has a thickness of 250 microns.

7. The camouflage material of claim 6, wherein the carbon black coating has a thickness of 40-60 microns.

8. The camouflage material of claim 7, wherein the aluminum coating has a thickness of 5-10 microns.

9. The camouflage material of claim 8, wherein the inner layer includes outer and inner polyester mesh films, and polyaramid fibers sandwiched between the polyester films.

10. The camouflage material of claim 9, wherein the inner layer is connected to the outer layer.

11. The camouflage material of claim 9, wherein the inner layer has a thickness of 5 to 10 mm.

12. The camouflage material of claim 9, wherein the inner layer has a thickness of 9.5 mm.

* * * * *